Patented Sept. 29, 1931

1,824,914

UNITED STATES PATENT OFFICE

HENRY MIROCOURT, OF SOTTEVILLE-LEZ-ROUEN, FRANCE, ASSIGNOR TO COMPAGNIE NATIONALE DE MATIERES COLORANTES ET MANUFACTURES DE PRODUITS CHIMIQUES DU NORD REUNIES, ETABLISSEMENTS KUHLMANN, OF PARIS, FRANCE, A CORPORATION OF FRANCE

MANUFACTURE OF CHROMED COMPLEXES OF AZO AND ORTHO-HYDROXY-AZO DYESTUFFS

No Drawing. Application filed August 20, 1928, Serial No. 300,977, and in France March 15, 1928.

This invention relates to the manufacture of chromed complexes of azo and ortho-oxy-azo dyestuffs.

The chromed complexes of azo and ortho-hydroxy-azo dyestuffs have been prepared up to the present time by reacting upon said dyestuffs with mineral salts of chromium such as the halogen compounds of chromium and in particular chromium fluoride, in the presence of agents for the absorption of hydrofluoric acid, or chromates in the presence of reducing agents, or chromium salts of organic fatty acids such as the formate and acetate of chromium in presence of reducing agents, or chromium hydroxide and alkaline chromites.

It is found that the chromium salts of the sulfonic acids of aromatic carbides such as benzene and its homologues or naphthalene and their substituted derivatives favor, in a very pronounced manner the formation of chromed complexes of azo and ortho-hydroxy-azo dyestuffs.

The new products obtained by means of these chromium salts are for the most part very pure. They are often crystalline and give much brighter dyeing than the corresponding products obtained by other processes and further they possess great lasting properties. They can be applied industrially in particular to the dyeing of animal textile fibres.

The salts of chromium employed can be obtained by means of double decomposition between a barium or calcium salt of a benzene or naphthalene sulphonic acid or of a homologue thereof and a solution of chromium sulphate.

In carrying out the invention, I may utilize the solutions of chromium aryl sulphonates prepared by the double decomposition of an alkaline or earth-alkaline salt of the sulfonic acids of the aromatic carbides above mentioned (benzene and its homologues, naphthalene, etc.) and solutions of chromium sulphate

Example 1

28 kgs. of the sodium salt of the azoic compound 4-hydroxy-benzene-1-azo-salicylic acid (obtained from diazotized p-aminosalicylic acid and phenol) are heated under reflux for about 8 hours with 400 litres of a solution of chromium benzene monosulphonate (containing 10 kilos $Cr_2O_3$).

The complex obtained is transformed into its sodium salt, which dyes wool in an acid bath in greenish yellow shades of great purity very fast to fulling and light.

Example 2

39.4 kgs. of the mono-sodium salt of the dyestuff resulting from the coupling of the diazo compound of 1-naphthylamine-4-sulphonic acid with salicylic acid are heated under reflux with 400 litres of a solution of chromium 1.5-naphthalene-disulphonate (containing 10 kilos $Cr_2O_3$). The transformation is complete in two hours. After treatment with sodium acetate the sodium salt of the chromed complex is isolated by salting out.

The product obtained gives on wool bright reddish yellow dyeings.

Example 3

34 kgs. of the free acid of the dyestuff resulting from the combination of the diazo derivative of 1-amino-2 naphthol 4-sulphonic acid and 1-phenyl-3-methyl-5-pyrazolone are heated in a leaded autoclave for 10 hours at 130° C. with 400 litres of a solution of chromium 1.5-naphthalene disulphonate (containing 10 kilos $Cr_2O_3$). At the end of this time the transformatiton is complete and the free acid of the new chromed complex separates in small crystals which have a metallic green reflex. Transformed into the sodium salt it dyes wool in an acid bath in bright rose shades while the corresponding product obtained by means of chromium formate, for example, gives only a dull bluish red.

Example 4

50 kgs. of the mono-sodium salt of the dyestuff obtained by means of the diazo derivative of 1-amino-2-naphthol 4-sulphonic acid and 1.8-naphthol mono sulphonic acid are heated under reflux with 500 litres of a solution of chromium 1.5-naphthalene disulphonate (containing 12.5 kilos $Cr_2O_3$). At the end of two hours the transformation is complete; the whole is allowed to cool; the chromed complex separates in small bronze crystals resembling those of methylene blue.

The new complex obtained dyes wool in greenish-blue shades of great purity and excellent fastness to light.

The analogous compounds of the same diazotized acid with $\alpha$ and $\beta$-naphthol are easily transformed into chromed complexes by treatment during six hours in an autoclave at 120° C. with the solution of chromium benzene monosulphonate.

*Example 5*

42 kgs. of the mono-sodium salt of the compound obtained by the action of the diazo compound of 5-nitro-2-amino-1-hydroxy-benzene and 2-naphthylamine-5.7-disulphonic acid are heated during 10 to 12 hours under reflux with 500 litres of a solution of chromium 1.5-naphthalenedisulphonate (containing 12.5 kilos $Cr_2O_3$).

At the end of this time the whole is allowed to cool. The chromed compound separates in the form of a crystalline powder appearing reddish by reflected light. It dyes wool in an acid bath in bluish-green shades which are very pure whereas the compound obtained by means of chromium formate gives much yellower shades.

By employing chromium benzene disulphonate and chromium naphthalene trisulphonate analogous results are obtained.

What I claim is:—

Process for the manufacture of chromed complexes of azo and ortho-hydroxy-azo dyestuffs by treating the dyestuff with a chromium salt of an aromatic sulphonic acid of the group consisting of benzene and naphthalene mono- and polysulphonic acids.

In testimony whereof I have signed this specification.

HENRY MIROCOURT.